(12) United States Patent  
Li et al.

(10) Patent No.: US 12,379,527 B2
(45) Date of Patent: Aug. 5, 2025

(54) INFRARED-TRANSMITTING HOUSING FOR PREVENTING LIGHT INTERFERENCE AND INFRARED POSITIONING HANDLE

(71) Applicant: QINGDAO PICO TECHNOLOGY CO., LTD., Shandong (CN)

(72) Inventors: Qiang Li, Shandong (CN); Zishang Wang, Shangdong (CN)

(73) Assignee: QINGDAO PICO TECHNOLOGY CO., LTD., Shandong (CN)

( * ) Notice: Subject to any disclaimer, the term of this patent is extended or adjusted under 35 U.S.C. 154(b) by 25 days.

(21) Appl. No.: 17/773,229

(22) PCT Filed: Sep. 16, 2021

(86) PCT No.: PCT/CN2021/118833
§ 371 (c)(1),
(2) Date: Nov. 17, 2022

(87) PCT Pub. No.: WO2022/237032
PCT Pub. Date: Nov. 17, 2022

(65) Prior Publication Data
US 2024/0151883 A1    May 9, 2024

(30) Foreign Application Priority Data
May 10, 2021  (CN) .......................... 202110505110.3

(51) Int. Cl.
*G02B 5/00*      (2006.01)
*G02B 5/20*      (2006.01)
(Continued)

(52) U.S. Cl.
CPC ............. *G02B 5/003* (2013.01); *G02B 5/208* (2013.01); *A63F 13/20* (2014.09); *A63F 13/213* (2014.09);
(Continued)

(58) Field of Classification Search
CPC ......... G02B 5/003; G02B 5/208; A63F 13/20; A63F 13/213; A63F 13/24; A63F 2300/10; A63F 2300/1031; A63F 2300/1043
(Continued)

(56) References Cited

U.S. PATENT DOCUMENTS 10,409,392 B1   9/2019  Allin et al.
10,549,183 B2 * 2/2020  Hope .................... A63F 13/428
(Continued)

FOREIGN PATENT DOCUMENTS

CN    101338416 A    1/2009
CN    101440971 A    5/2009
(Continued)

OTHER PUBLICATIONS

International Search Report issued Jan. 27, 2022 in International Patent Application No. PCT/CN2021/118833.
(Continued)

*Primary Examiner* — Allen Chan

(57) ABSTRACT

Some embodiments of the present disclosure provide an infrared-transmitting housing for preventing light interference and an infrared positioning handle. The infrared-transmitting housing for preventing light interference includes a first housing and a second housing disposed on an outer side of the first housing, wherein the first housing is an infrared-transmitting member and the second housing is a light-shielding member; the second housing is provided with a via corresponding to a position of an infrared lamp of an external device; and the first housing and the second housing are integrally formed by a two-shot injection molding.

16 Claims, 2 Drawing Sheets

(51) Int. Cl.
   *A63F 13/20* (2014.01)
   *A63F 13/213* (2014.01)
   *A63F 13/24* (2014.01)
(52) U.S. Cl.
   CPC .......... *A63F 13/24* (2014.09); *A63F 2300/10* (2013.01); *A63F 2300/1031* (2013.01); *A63F 2300/1043* (2013.01)
(58) Field of Classification Search
   USPC .......................................................... 463/37
   See application file for complete search history.

(56) References Cited

U.S. PATENT DOCUMENTS

| | | | | |
|---|---|---|---|---|
| 11,185,763 | B2 * | 11/2021 | Bradner | ............... A63F 13/573 |
| 11,442,280 | B2 * | 9/2022 | McCracken | ....... G02B 27/0176 |
| 2015/0071465 | A1 | 3/2015 | Zalisk et al. | |
| 2016/0346681 | A1 * | 12/2016 | Tsai | ........................ A63F 13/24 |
| 2019/0344173 | A1 | 11/2019 | Mucha et al. | |
| 2020/0134895 | A1 | 4/2020 | Pollard et al. | |
| 2020/0301508 | A1 | 9/2020 | Uchida et al. | |

FOREIGN PATENT DOCUMENTS

| | | |
|---|---|---|
| CN | 201251107 Y | 6/2009 |
| CN | 205434707 U | 8/2016 |
| CN | 205610761 U | 9/2016 |
| CN | 106598239 A | 4/2017 |
| CN | 106873163 A | 6/2017 |
| CN | 107146727 A | 9/2017 |
| CN | 108954740 A | 12/2018 |
| CN | 208936432 U | 6/2019 |
| CN | 109963112 A | 7/2019 |
| CN | 111701228 A | 9/2020 |
| CN | 211454097 U | 9/2020 |
| CN | 113238606 A | 8/2021 |
| JP | 2007-168668 A | 7/2007 |
| JP | 2020-154452 A | 8/2020 |

OTHER PUBLICATIONS

European Search Report for EP Patent Application No. 21941599.9, Issued on Sep. 9, 2024, 6 pages.

Office action received from Japanese patent application No. 2023-569605 mailed on Oct. 29, 2024, 7 pages (4 pages English Translation and 3 pages Original Copy).

Written Opinion for International Application No. PCT/CN2021/118833, mailed Jan. 27, 2022, 8 Pages.

Notice of Reasons for Refusal Issued in JP. Appl. No. 2023-569605 issued Mar. 17, 2025, English translation, 6 pages.

* cited by examiner

INFRARED-TRANSMITTING HOUSING FOR PREVENTING LIGHT INTERFERENCE AND INFRARED POSITIONING HANDLE

CROSS-REFERENCE TO RELATED APPLICATION

The present disclosure claims the priority of the patent application filed with the CNIPA on May 10, 2021, with the present application number of 202110505110.3 and the title of "INFRARED-TRANSMITTING HOUSING FOR PREVENTING LIGHT INTERFERENCE AND INFRARED POSITIONING HANDLE".

TECHNICAL FIELD

The present disclosure relates to the field of infrared positioning devices, in particular to an infrared-transmitting housing for preventing light interference and an infrared positioning handle.

BACKGROUND

With a progress of society and a development of technology, the application of artificial reality systems in computer games, health and safety, industry and education is becoming more and more common. For example, artificial reality systems are being integrated into mobile devices, game consoles, personal computers, cinemas and theme parks. In general, artificial reality is a form of adjusting reality in some way prior to presentation to a user, which may include, for example, virtual reality (VR), augmented reality (AR), mixed reality (MR), mixed reality or some combinations and/or derivatives thereof. A typical artificial reality system uses one or more devices to interact with the system and present and display content to one or more users. As an example, the artificial reality system includes a head-mounted display (HMD) and a positioning handle worn by a user and configured to output relevant contents of the artificial reality to the user.

The positioning handle known to inventors is usually covered with an infrared-transmitting plastic material outside an infrared lamp. Since a solution does not add an external light-shielding component, as a result, the handle cannot be used indoors or outdoors with strong light, a scope of application is limited. In order to overcome this problem, an integral light-shielding cover is usually directly sleeved outside the infrared-transmitting plastic material of the positioning handle. Because the light-shielding cover and the infrared-transmitting plastic material cannot be precisely positioned or firmly positioned, it is easy to cause the light-shielding cover to move outside the handle during use, which affects the use and user experience of infrared lamps.

SUMMARY

In view of the above problems, some embodiments of the present disclosure provide an infrared-transmitting housing for preventing light interference and an infrared positioning handle, so as to solve the problems existing in the current positioning handle, such as it is easy to move between a light shielding cover and an infrared-transmitting piece, inability to accurately locate a light transmission position of an infrared lamp, and influence on user experience.

The infrared-transmitting housing for preventing light interference provided by some embodiments of the present disclosure includes a first housing and a second housing disposed on an outer side of the first housing, wherein the first housing is an infrared-transmitting member and the second housing is a light-shielding member; the second housing is provided with a through hole corresponding to a position of an infrared lamp of an external device; and the first housing and the second housing are integrally formed by a two-shot injection.

In some embodiments, the second housing is further provided with a plurality of anti-collision bumps; and the plurality of anti-collision bumps are evenly distributed around an outer side of the second housing.

In some embodiments, each of the anti-collision bumps is of circular, elliptical or strip-shaped.

In some embodiments, the second housing is a light-shielding silicone member or light-shielding plastic member.

In some embodiments, the infrared-transmitting housing includes a positioning structure disposed on an inner side of the first housing away from the second housing; wherein the positioning structure is configured to dispose in a position to adapt to the external device provided with the infrared lamp.

In some embodiments, the positioning structure and the first housing are an integrally-formed structure.

In some embodiments, a size of the through hole is adapted to fit a size of the infrared lamp at a corresponding position; and the through hole is disposed through the second housing.

According to another aspect of some embodiments of the present disclosure, an infrared positioning handle is provided, which includes a handle body, an inner housing and an outer housing disposed on an upper end of the handle body, and an infrared light ring disposed between the inner housing and the outer housing, wherein an infrared-transmitting housing is sleeved on an outer side of the outer housing corresponding to a position of the infrared light ring; and the infrared housing is the infrared-transmitting housing for preventing light interference as above.

In some embodiments, a position of the through hole of the infrared-transmitting housing for preventing light interference corresponds to a position of an infrared lamp on the infrared light ring one by one.

In some embodiments, the infrared-transmitting housing for preventing light interference is fixed to an outer side wall of the outer housing by a positioning member located inside the first housing.

By utilizing the above infrared-transmitting housing for preventing light interference and the infrared positioning handle, the first housing is an infrared-transmitting member and the second housing is a light-shielding member, the second housing is provided with a through hole corresponding to a position of an infrared lamp of an external device, and the first housing and the second housing are integrally formed by a two-shot injection molding, which can not only precisely position the light-shielding portion of the infrared lamp, but can also prevent a displacement between the infrared-transmitting part and the light-shading part. The housing is convenient to assemble, stable in performance and strong in user experience.

To achieve the above and related objects, one or more aspects of the present disclosure include features that will be described in detail later. The following description and accompanying drawings set forth in detail certain exemplary aspects of the present disclosure. However, these aspects only illustrate some of the ways in which the principle of the present disclosure may be used. Further, the present disclosure is intended to include all such aspects and their equivalents.

BRIEF DESCRIPTION OF THE DRAWINGS

Other objects and results of this disclosure will be more apparent and readily understood by reference to the following description taken in conjunction with the accompanying drawings and with a fuller understanding of the present disclosure. In the drawings.

Figure 1:
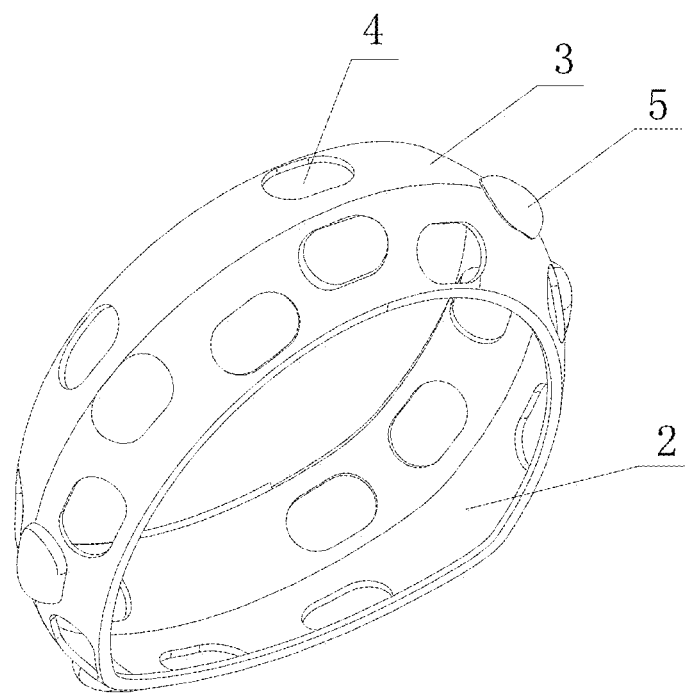
FIG. 1 is a perspective view of an infrared-transmitting housing for preventing light interference according to an embodiment of the present disclosure.

The reference signs include:

1, handle body; 2, first housing; 3. second housing; 4. through hole; 5. anti-collision bump; 6. positioning structure.

The same label may be used in all drawings to indicate similar or corresponding features or functions.

DETAILED DESCRIPTION OF THE EMBODIMENTS

In the following description, for purposes of explanation, numerous specific details are set forth in order to provide a thorough understanding of one or more embodiments. It may be evident, however, that such embodiment(s) may be practiced without these specific details. In other examples, known structures and devices are shown in block diagram form in order to facilitate the description of one or more embodiments.

In the description of the present disclosure, it should be understood that orientation or positional relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counter-clockwise", "axial", "radial", "circumferential", etc. are based on the orientation or positional relationships shown in the drawings, for ease of description of the present disclosure and simplification of the description only, these terms do not indicate or imply that the apparatus or element referred to must have a specific orientation or be constructed and operated in a specific orientation, and therefore cannot be construed as limitations to the present disclosure.

For a detailed description of the infrared-transmitting housing for preventing light interference and the infrared positioning handle of the present disclosure, specific embodiments of the present disclosure will be described in detail below with reference to the accompanying drawings.

FIG. 1 shows a schematic structure of an infrared-transmitting housing for preventing light interference according to an embodiment of the present disclosure.

As shown in FIG. 1, the infrared-transmitting housing for preventing light interference (an infrared-transmitting housing for short) of the embodiment of the present disclosure includes a first housing 2 and a second housing 3 disposed on an outer side of the first housing 2, wherein the first housing 2 is an infrared-transmitting member and the second housing 3 is a light-shielding member; the second housing 3 is provided with a through hole 4 corresponding to a position of an infrared lamp of an external device; the infrared-transmitting housing is disposed on an outside of the infrared lamp in a covering manner, and the first housing 2 and the second housing 3 are integrally formed by a two-shot injection molding, that is, the first housing 2 and the second housing 3 are an integrally-formed structure, there is no case where the two housings are displaced from each other.

In some embodiments, in order to prevent external devices from colliding with the infrared-transmitting housing during use, a plurality of anti-collision bumps 5 is disposed on a surface of the second housing 3, and positions of the anti-collision bumps 5 can be disposed according to a shape or structure of the infrared-transmitting housing, for example, the anti-collision bumps 5 are evenly distributed around the outer side of the second housing 3, or the anti-collision bumps 5 are disposed at a position prone to collision, etc.

In some embodiments, the anti-collision bumps 5 are disposed in various shapes such as circular, elliptical or strip, and may be integrally formed with the second housing 3, i.e., the plurality of anti-collision bumps 5 are directly formed on the outer side of the second housing 3 by a two-shot injection molding method.

In some embodiments of the present disclosure, the first housing 2 is disposed as an infrared-transmitting plastic member, the second housing 3 is disposed as a light-shielding silicone member or a light-shielding plastic member and other structural members with light-shielding function, and the first housing 2 and the second housing 3 are integrally formed by a two-shot injection molding, wherein thermoplastic parts of two different compositions can be prepared by the two-shot injection molding, so that the first housing 2 and the second housing 3 with different materials can be injection molded into an integrated structure.

In some embodiments, to ensure a precisely positioning between the infrared-transmitting housing and the external device, a positioning structure is also disposed on an inner side, away from the second housing 3, of the first housing 2. A position of the positioning structure is adapted to a positioning portion on the external device provided with an infrared lamp. In a process of assembling the infrared-transmitting housing, a position of the through hole 4 and the position of the infrared lamp are ensured to correspond to each other only by ensuring the mutual adaptation between the positioning structure and the positioning portion of the external device, so that the installation of the infrared-transmitting housing is simplified and the position accuracy of the infrared-transmitting housing is ensured.

Figure 2:
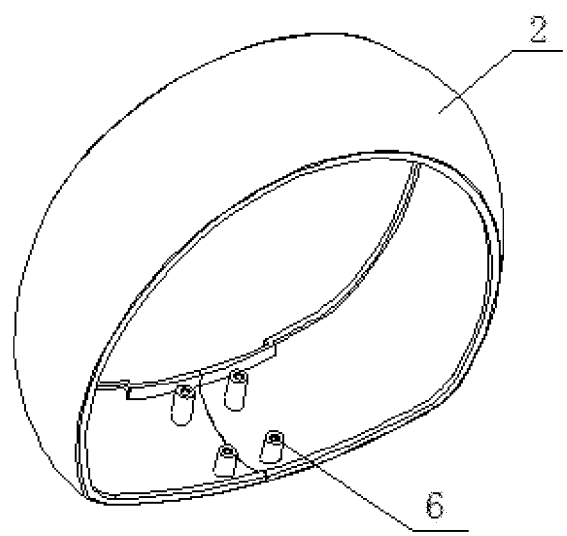
FIG. 2 is a structural schematic diagram of a first housing according to an embodiment of the present disclosure.

In some embodiments, FIG. 2 shows a schematic structure of the first housing 2 according to an embodiment of the present disclosure.

As shown in FIG. 2, in a process of the two-shot injection molding, the first housing 2 is an infrared-transmitting member, and four convex cylindrical positioning structures 6 are disposed inside the first housing 2. The position and number of the positioning structures 6 can be matched according to the positioning portion of external device. Similar to the anti-collision bumps, in some embodiments, the positioning mechanism of some embodiments of the present disclosure can also be disposed with the first housing 2 as an integral-formed structure.

Further, the shape, size and setting position of the positioning structure 6 can be set and adjusted according to the requirements of external setting, and is not limited to the cylindrical structure shown in the drawings, but can also be set as a plurality of positioning structures evenly distributed around the inner side of the first housing 2.

In one specific implementation of the present disclosure, the through hole is disposed on the second housing and passes through the second housing. The setting position and number of the through holes correspond to the position and number of infrared lamps respectively. The size of the through hole can be adjusted according to the size and requirements of the infrared lamp. After the infrared-transmitting housing is assembled with the external device, the light of the infrared lamp is transmitted through the corresponding via and the first housing 2, and other positions are shielded by the second housing, so as to prevent an external light from affecting the infrared lamp or infrared positioning, which not only has accurate shielding position, but also does not have a movement between housings, and thus the positioning requirements of external device are satisfied.

Corresponding to the infrared-transmitting housing for preventing light interference, some embodiments of the present disclosure also provide an infrared positioning handle, that is, the external device can be other equipment or devices that need to be provided with infrared lamps, such as an infrared positioning handle. In some embodiments, FIG. 3 illustrates a schematic structure of an infrared positioning handle according to an embodiment of the present disclosure.

Figure 3:
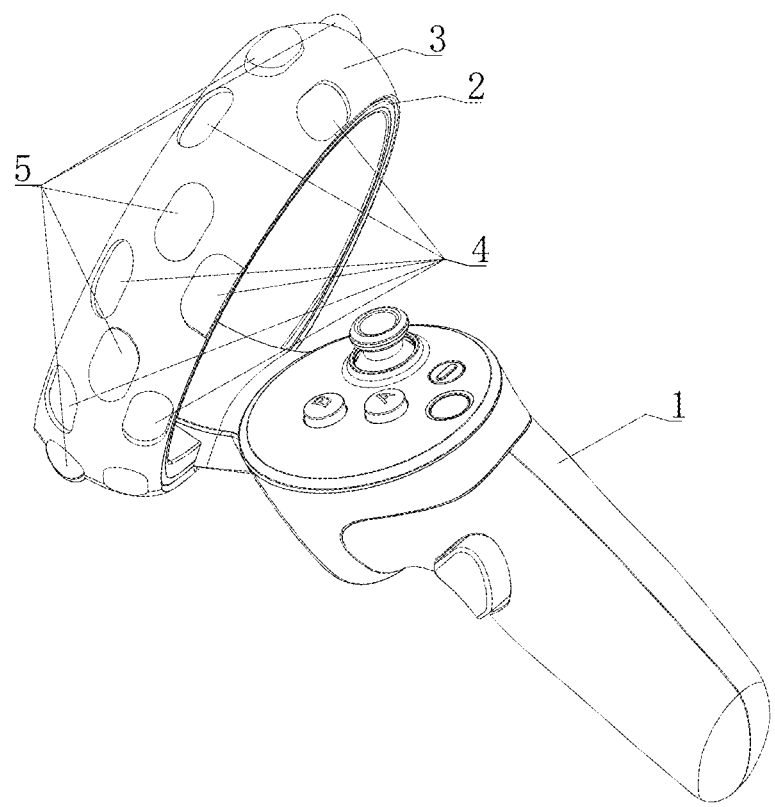
FIG. 3 is a schematic structural diagram of an infrared positioning handle according to an embodiment of the present disclosure.

As shown in FIG. 3, the infrared positioning handle of the embodiment of the present disclosure includes a handle main body 1, an inner housing (not shown in the figure) and an outer housing (not shown in the figure) disposed at an upper end of the handle body 1, and an infrared light ring disposed between the inner housing and the outer housing, wherein an infrared-transmitting housing is sleeved on an outer side of the outer housing corresponding to a position of the infrared light ring; and the infrared housing is the infrared-transmitting housing for preventing light interference as above.

A position of a via of the infrared-transmitting housing for preventing light interference corresponds to a position of an infrared lamp on the infrared light ring one by one, and the infrared-transmitting housing for preventing light interference is fixed to an outer side wall of the outer housing by a positioning member (i.e., a positioning structure in the embodiment of the infrared-transmitting housing for preventing light interference) located inside the first housing.

The embodiment of the infrared positioning handle described above may be referred to as described in the embodiment of the infrared-transmitting housing for preventing light interference and will not be repeated here.

According to the infrared-transmitting housing for preventing light interference and the infrared positioning handle provided by some embodiments of the present disclosure, the non-infrared part of the external device are shielded by the second housing, to prevent external light from affecting infrared lamp or infrared positioning, the shielding part is precisely positioned, there is no case of housing moving, and locally providing anti-collision bumps can effectively prevent device damage caused by accidental collision. The infrared-transmitting housing is simple and convenient to assemble and has high position accuracy.

The infrared-transmitting housing for preventing light interference and infrared positioning handle according to the present disclosure are described above by way of example with reference to the drawings. However, it will be understood by those skilled in the art that various modifications may be made to the infrared-transmitting housing for preventing light interference and infrared positioning handle described above without departing from the contents of the present disclosure. Therefore, the scope of protection of the present disclosure should be determined by the contents of the appended claims.

What is claimed is:

1. An infrared-transmitting housing for preventing light interference, wherein the infrared-transmitting housing comprises a first housing and a second housing disposed on an outer side of the first housing, wherein
    the first housing is an infrared-transmitting member and the second housing is a light-shielding member;
    the second housing is provided with a through hole corresponding to a position of an infrared lamp of an external device; and
    the first housing and the second housing are integrally formed by a two-shot injection molding.

2. The infrared-transmitting housing for preventing light interference as claimed in claim 1, wherein
    the second housing is further provided with a plurality of anti-collision bumps; and
    the plurality of anti-collision bumps is evenly distributed around an outer side of the second housing.

3. The infrared-transmitting housing for preventing light interference as claimed in claim 2, wherein
    each of the plurality of anti-collision bumps is of circular, elliptical or strip-shaped.

4. The infrared-transmitting housing for preventing light interference as claimed in claim 1, wherein
    the first housing is an infrared-transmitting plastic member; and
    the second housing is a light-shielding silicone member or light-shielding plastic member.

5. The infrared-transmitting housing for preventing light interference as claimed in claim 1, wherein the infrared-transmitting housing comprises a positioning structure disposed on an inner side of the first housing away from the second housing; wherein the positioning structure is configured to dispose in a position to adapt to the external device provided with the infrared lamp.

6. The infrared-transmitting housing for preventing light interference as claimed in claim 5, wherein
    the positioning structure and the first housing are an integrally-formed structure.

7. The infrared-transmitting housing for preventing light interference as claimed in claim 1, wherein
    a size of the through hole is adapted to fit a size of the infrared lamp at a corresponding position; and
    the through hole is disposed through the second housing.

8. An infrared positioning handle, comprising a handle body, an inner housing and an outer housing disposed on an upper end of the handle body, and an infrared light ring disposed between the inner housing and the outer housing, wherein
    the infrared-transmitting housing as claimed in claim 1 is sleeved on an outer side of the outer housing corresponding to a position of the infrared light ring.

9. The infrared positioning handle as claimed in claim 8, wherein
    a position of the through hole of the infrared-transmitting housing for preventing light interference corresponds to a position of an infrared lamp on the infrared light ring one by one.

10. The infrared positioning handle as claimed in claim 8, wherein
    the infrared-transmitting housing for preventing light interference is fixed to an outer side wall of the outer housing by a positioning member located inside the first housing.

11. The infrared positioning handle as claimed in claim 8, wherein the second housing is further provided with a plurality of anti-collision bumps; and the plurality of anti-collision bumps is evenly distributed around an outer side of the second housing.

12. The infrared positioning handle as claimed in claim 11, wherein each of the plurality of anti-collision bumps is of circular, elliptical or strip-shaped.

13. The infrared positioning handle as claimed in claim 8, the first housing is an infrared-transmitting plastic member; and the second housing is a light-shielding silicone member or light-shielding plastic member.

14. The infrared positioning handle as claimed in claim 8, wherein the infrared-transmitting housing comprises a positioning structure disposed on an inner side of the first housing away from the second housing; wherein the positioning structure is configured to dispose in a position to adapt to the external device provided with the infrared lamp.

15. The infrared positioning handle as claimed in claim 14, wherein the positioning structure and the first housing are an integrally-formed structure.

16. The infrared positioning handle as claimed in claim 8, wherein a size of the through hole is adapted to fit a size of the infrared lamp at a corresponding position; and the through hole is disposed through the second housing.

\* \* \* \* \*